Nov. 21, 1961  N. Z. ALCOCK  3,010,020
APPARATUS FOR CONTINUOUSLY MEASURING THE
MASS PER UNIT AREA OF A COATING
Filed May 16, 1956  4 Sheets-Sheet 1

Inventor
NORMAN Z. ALCOCK by: J. Richard Cavanagh

Inventor
NORMAN Z. ALCOCK

Nov. 21, 1961

N. Z. ALCOCK 3,010,020

APPARATUS FOR CONTINUOUSLY MEASURING THE
MASS PER UNIT AREA OF A COATING

Filed May 16, 1956

Inventor
NORMAN Z. ALCOCK
by: J. Richard Bavanagh

Inventor
NORMAN Z. ALCOCK
by: J. Richard Cavanagh

United States Patent Office 3,010,020
Patented Nov. 21, 1961

3,010,020
APPARATUS FOR CONTINUOUSLY MEASURING THE MASS PER UNIT AREA OF A COATING
Norman Z. Alcock, Oakville, Ontario, Canada, assignor to Curtiss-Wright Corporation, New York, N.Y., a corporation of Delaware
Filed May 16, 1956, Ser. No. 585,313
Claims priority, application Canada May 17, 1955
5 Claims. (Cl. 250—83.6)

This invention relates to improvements in apparatus for continuous measurement of the mass per unit area of sheet material.

The invention is particularly directed to improvements in continuous sheet measuring apparatus as set forth in U.S. Patent 2,675,483 owned by the assignee of this application. While the apparatus of said patent is suitable for measuring the mass per unit area of a sheet with high accuracy, it has been used for the measurement of a coating on a sheet only in the sense that such coating increases the mass per unit area of the sheet. In such prior apparatus the mass per unit area measurement was usually calibrated as thickness for convenience. Accordingly the same substitution of terminology may be employed in this specification.

It is a main object of this invention to provide an apparatus for measuring the thickness of only the coating on a sheet and in addition, to provide an apparatus for measuring a variation in thickness of a coating on a sheet or base stock, wherein the accuracy of measurement is substantially independent of the thickness of the sheet.

This invention also contemplates the provision of apparatus for continuously measuring the mass per unit area of sheet material or of a coating wherein a body casting carries a detector mounting tube and a source mounting tube in parallel spaced apart relation and the sub-assembly components or units of said apparatus are slidable into said tubes from the ends thereof for easy insertion and removal for servicing and the like and wherein the various units so insertable into said tubes are adapted to make electrical contact with one another therein to complete the electrical circuitry of the said apparatus.

In prior apparatus of the class considered herein, the measured output of said apparatus has been derived from an electrical circuit embodying a detector and a radiation source between which is placed the sheet being measured and a balancing unit in said circuit embodying a balancing ionization chamber essentially in bridge circuit relationship with the said detector with respect to the output of the apparatus and wherein the balancing chamber is activated by a separate source of radiation which may be adjusted in its distance from the chamber whereby the operator may, by adjustment, cancel out the basic or mean thickness of the sheet being measured so that the resulting measurement represents variation from this mean thickness.

By way of contrast, the present invention, while likewise embodying a detector and a balancing ionization chamber, provides for adjustment of the activation of the balancing chamber by means of a movable iris disposed between the second source which, in this case, is fixed relative to the balancing chamber. By this means, a wide range of adjustment is afforded from zero activation of said chamber to maximum activation thereof by said source at said fixed distance.

Having regard to the foregoing, other objects of the invention will be appreciated by a study of the following specification taken in conjunction with the accompanying drawings.

In the drawings:
FIGURE 1 is a diagrammatic illustration of an improved continuous sheet measuring apparatus of the invention;

Figure 4:
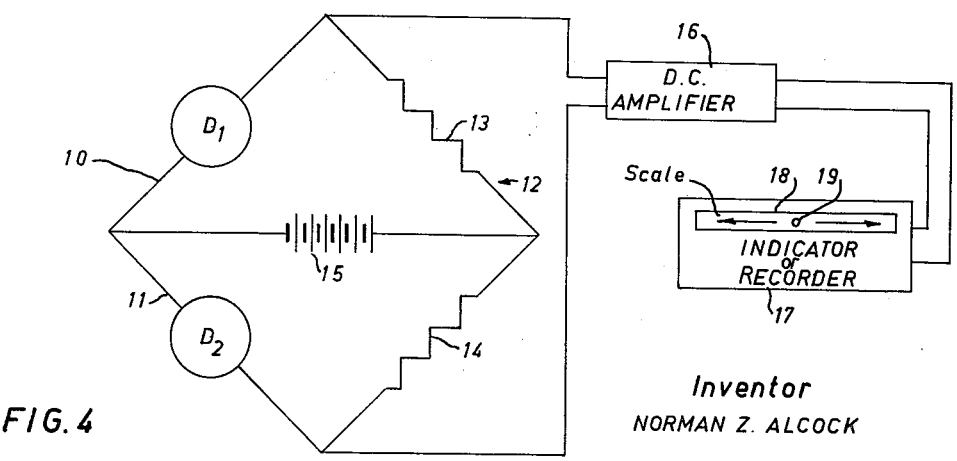
FIGURE 4 is a general electrical schematic illustrating the balancing system of the invention as applied to the apparatus illustrating one form of balancing system which may be applied to the apparatus of FIGURES 1 to 3.

In the apparatus for continuously measuring material thickness according to the invention, two radiation detecting devices such as ionization chambers, are employed in bridge circuit relationship as indicated at $D_1$ and $D_2$ in FIGURE 4 wherein the said detectors are disposed in arms 10 and 11 of bridge 12 having opposing arm resistors 13 and 14 in bridge connection with a source of power 15, the output of the bridge being connected to a direct current amplifier 16 controlling an indicator or recorder 17 adapted to show a reading on scale 18 representing deviation from either side of a median zero or null point 19.

Figure 1:
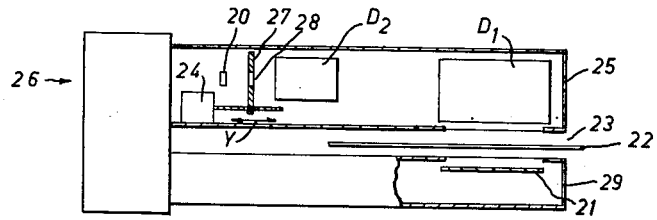

As indicated in FIGURE 1, the detectors $D_1$ and $D_2$ may be activated by separate radiation sources 20 and 21 each of which is fixed relative to the placement of its associated detector. A sheet 22 passing between the fixed gap 23 is subjected to radiation from source 21. The unabsorbed radiation energizes ionization chamber detector $D_1$. The sources are preferably formed of a beta emitting source material such as, for example, thallium 204 of 800 kilovolts and 20 millicuries of a physical size in the case of the source 21 of, for example, one inch in width and 14 inches in length. The detector $D_1$ may be transversely activated form of ionization chamber of the general class set forth in the said Patent 2,675,483. According to the present invention, a remotely controlled servo motor 24 in the upper arm 25 of apparatus 26 is adapted to move the iris plate 27 having an iris opening 28 therein between the source 20 and detector $D_2$ as indicated by arrows Y in a manner more specifically disclosed hereinafter. By this means, the output of the bridge circuit 12 of FIGURE 4 may be adjusted to a mean thickness reading for the material 22 whereby deviation from such thickness may be read directly on the scale 18. The invention contemplates a modification in the use of the source 21 in the lower arm 29 in the manner indicated in FIGURE 2.

Figure 3:
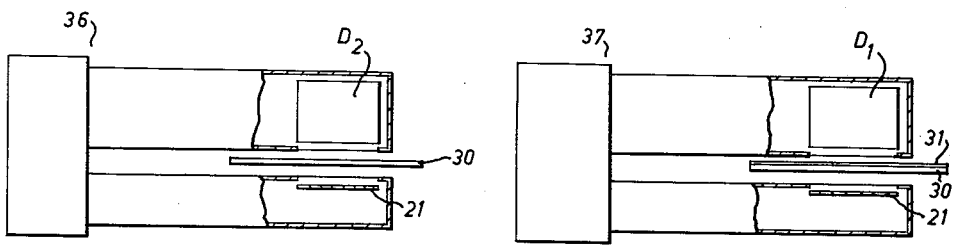
FIGURE 3 is a composite view of apparatus of the invention showing two units of simple form adapted for the measurement of the thickness of a coating, particularly where the coating is thin relative to the thickness of the base stock.

In many cases, it may be desired to measure the variation in thickness of a coating on a base sheet. In the apparatus illustrated in FIGURE 2, a sheet 30 may have a coating 31 applied thereto continuously as the sheet moves past a determined point. In the measuring system shown in this figure, two apparatus units 32 and 33 are employed wherein the unit 32 is disposed over the sheet 30 at a point in advance of coating application and the unit 33 is disposed to measure the variation in thickness of coating 31 on the sheet 30. The detectors $D_1$ and $D_2$ in this case are both of the transversely activated type and both units are similar to the unit 26 shown in FIGURE 1 as regards the source 21 and detectors disposed thereabove in each case. However, the unit 32 embodies an iris plate 34 movable between the source 21 and detector $D_2$ by the servo motor 35, as indicated by arrows Y; the iris in this case being in the form of an opening in plate 34. In operation, the iris plate 34 is adjusted to mask off sufficient radiation passing to the detector $D_2$ to correspond to predetermined thickness of coating 31 thereon. Accordingly, the difference variation detected by the two units operating through a bridge relationship as indicated in FIGURE 4 and D.C. amplifier 16 will show a difference reading representing variation from a selected coating thickness. Accordingly, small variations in coating thickness can be measured regardless of the thickness of the coating or the thickness of the base stock. Therefore, this system is particularly adaptable to the control of heavy coatings.

Where the control of a thin coating is desired, a very simple system (FIG. 3) may be employed with two similar units 36 and 37 having identical detectors $D_1$ and $D_2$ and sources 21. Because the coating thickness is small relative to the thickness or density of the base stock 30, coating thickness may be retained within the range of the scale 18 of FIGURE 4. The application of this simplified system to the controlled deposition of thin volumes and the like will be apparent. As before, the two detecting devices are balanced against each other in a suitable bridge circuit such as that indicated in FIGURE 4 and the difference result is amplified and read as before noted.

Figure 2:
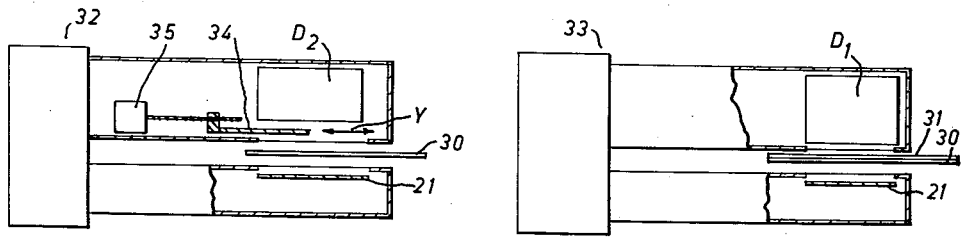
FIGURE 2 is a composite view illustrating the use of two sheet measuring devices of the invention of a modified form for measuring variation in coating thickness.

The sensitivity of the output circuit of the direct current amplifier 16 shown in FIGURE 4 is automatically adjusted when adjustment is made to cancel out the coating weight by adjusting the iris controlling the activation of the second detector $D_2$ of the forms of apparatus and method illustrated in FIGURES 1 and 2.

Figure 5:
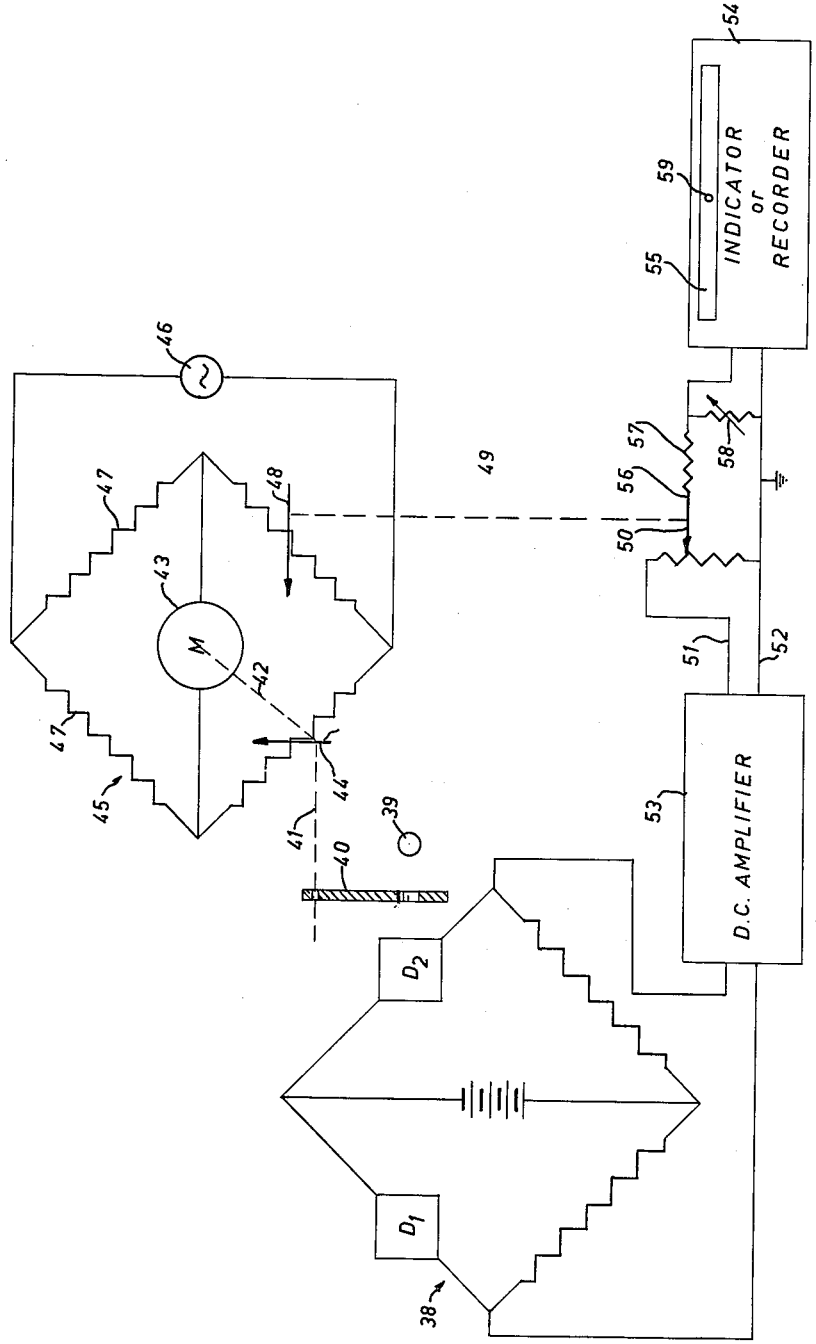
FIGURE 5 is an electrical-diagrammatic illustration of apparatus for accomplishing a continuous self-balancing out of one component of the sheet being measured such as, for example, the base stock and coating where it is desired to measure a variation in coating thereon.

Thus referring to FIGURE 5, the detector bridge 38 having detectors $D_1$ and $D_2$ as before, embodies a radiation source 39 supported a fixed distance from detector $D_2$ wherein the amount of radiation desired to be cancelled out of an output reading is controlled by adjustment of iris plate 40 in operative connection as indicated by chain lines 41 and 42 to and driven by the servo motor 43. The drive connection or means 42 also actuates the potentiometer 44 in the servo motor bridge 45 driven by power source 46 having resistance arms 47 and a manual weight adjustment potentiometer arm 48 ganged as indicated by chain line 49 to an adjustable sensitivity potentiometer control 50. Manual adjustment of control 48 effects ganged adjustment of sensitivity potentiometer 48 causing an unbalanced condition in bridge 45 causing servo motor 43 (which latter may be suitably coupled in this bridge circuit by a conventional servo amplifier not shown) to drive potentiometer 44 to balance, and iris plate 40 to a position controlling the amount of radiation striking detector $D_2$ to a quantity corresponding to the manual weight setting accomplished by adjustment of weight setting potentiometer 48. By this means, the iris plate may be placed in a relatively inaccessible position and remotely controlled. Moreover, since potentiometer 50 effectively shunts the output leads 51 and 52 of direct current amplifier 53 amplifying the difference measurement of bridge 38 from detectors $D_1$ and $D_2$, sensitivity of the device, i.e., width of full scale reading, is automatically compensated for different coating weights. The indicator or recorder 54 having scale 55 is connected to control potentiometer arm 56 through relatively high series resistance 57 and shunting potentiometer 58. A percentage deviation reading from null point 59 on scale 55 can be adjusted by potentiometer 58 so that at say 20 percent weight deviation from null or balance point 59, a full scale reading is obtained. At another adjustment of potentiometer 58, a full scale reading may correspond to say five percent deviation. Preferably, a plurality of resistances connectable in circuit by a suitable switch element and adapted to give full scale predetermined deviations by percentage or by coating weight replace the potentiometer 58.

It will be apparent that while the apparatus of FIGURE 5 has been presented in simplified diagrammatic form so that the principles thereof may be more easily understood, the essential feature embodies a change in sensitivity as the weight set null point 59 is altered. For a constant weight deviation, the sensitivity must be increased as the weight is increased but for a constant percent deviation the sensitivity must be decreased as the weight is increased. The apparatus of FIG. 5 may be used in similar manner for measuring deviation from standard thickness of an uncoated sheet. In such case, as indicated in FIG. 5, no sheet, but merely the iris plate 40 is interposed of source 39 and detector $D_2$.

Figure 6:
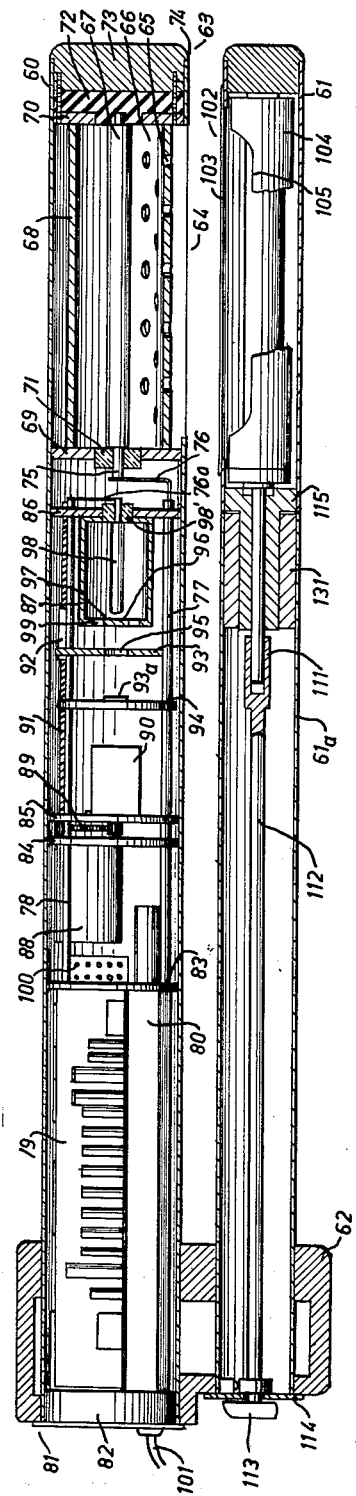
FIGURE 6 is a sectional view of a preferred construction of sheet measuring device of the invention.
Figure 8:
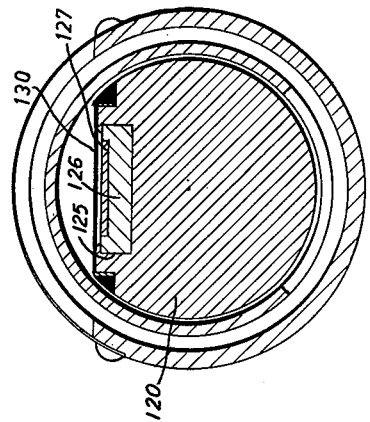
FIGURE 8 is a sectional view on the line 8—8 of FIGURE 7.
Figure 7:
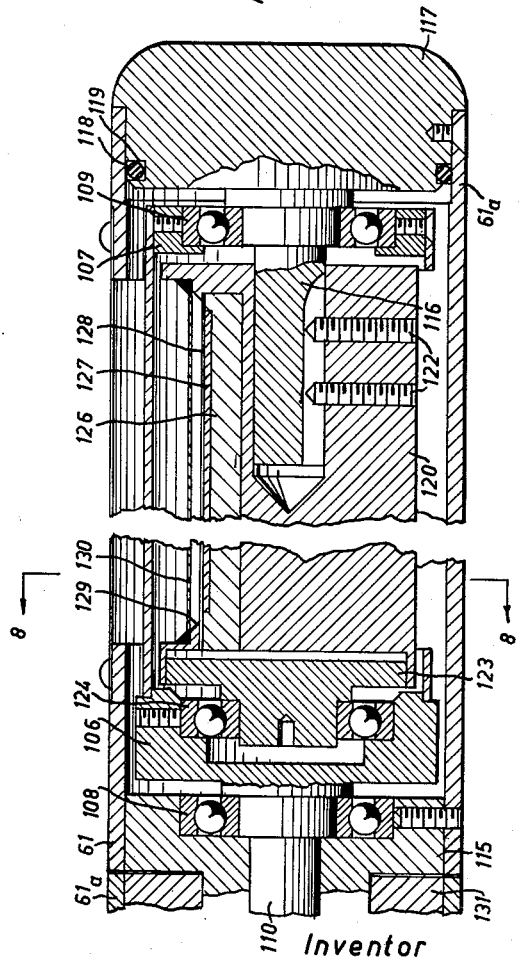
FIGURE 7 is an axial section of the radiation source carrying unit of the device of FIGURE 6.
Figure 9:
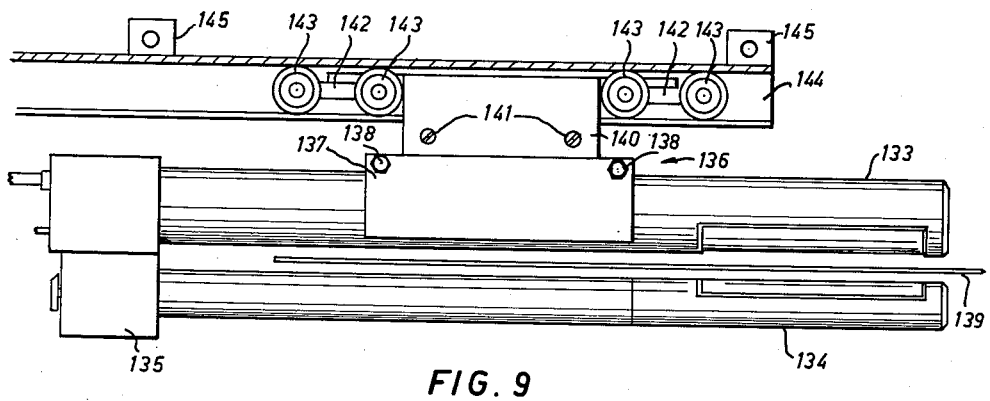
FIGURE 9 is an elevation of apparatus of the invention indicating a preferred method of mounting same.

A more detailed disclosure of a preferred form of apparatus of the invention is set forth in FIGURES 6 to 8. The assembly of components is adapted to ready servicing and is mounted in the parallel spaced apart tubular housings 60 and 61 extending through and threaded in the support 62. The housing 60 hereinafter referred to, has the detector housing at the head or outward end 63 thereof as an opening 64 through which radiation may pass through the holes 65 in outer electrode wall 66 to irradiate the inner electrode 67 of the ionization chamber 68. The inner electrode and outer electrode wall of the chamber are supported by end fittings 69 and 70 carrying insulating means 71 and 72, serving to insulate the inner and outer electrodes from one another. The end walls 69 and 70 being substantially disc-shaped, are adapted to slidably fit within the tubular housing 60. The limit of insertion of the ionization chamber unit is determined by suitable stops or by the cap 73 having a lip 74 adapted to stop against the outward end of the tubular housing 60. Electrical connections are made to the inner electrode 67 of the ionization chamber, in this case constituting the detector $D_1$, and to the inner electrode 98 of an ionization chamber 87 (detector $D_2$, described in detail hereinafter), by contact of the electrode terminals to respectively the spring contact strips 76 and 76a connected to respectively electrical leads proceeding through supporting tubes 77 and 78 to a bridge circuit (not shown) embodied in electronic amplifier and bridge devices 79 supported by a chassis frame 80 slidable into the tubular housing 60 from the rearward end 81 thereof. The outer electrodes of the chambers 68 and 87 are grounded to the tubular wall 60, the former via fittings 69 and 70, and the latter via a disc 86.

The chassis frame 80 is rigidly fastened to the rear cap 82 at one end and at its outward end is rigidly fastened to a disc 83 slidable within the tubular housing and connected by tubes 77 and 78 to a further series of discs 84, 85 and 86 whereby all of the structure from the rear cap 82 to the most forward disc 86 is constructed as a removable unit carrying a second ionization chamber 87 or detector $D_2$.

Components discussed in review of the previous figures will be recognized in the servo motor 88 adapted through gear drive connection 89 to actuate potentiometer 90 and through the agency of the worm shaft 91 adapted to drive via a sleeve collar 92 the thereby supported iris plate 93 for adjustable motion previously discussed between the balancing ionization chamber 87 and the balancing radiation source 93a; the latter being supported on the fixed plate 94 fastened to the tubes 77 and 78. It should be observed that the iris opening 95 is of lesser diameter than a masking portion 96 of the end wall 97 of the ionization chamber 87. The anode 98 of this chamber is insulated from the outer electrode 87 by spacer 98', and is supported behind the masking portion 96 whereby a placement of iris opening 95 in close proximity to masking portion 96 will substantially obviate the passage of radiation into the chamber 87 through the openings 99 thereof. The required electrical connections are made through insulated leads carried by the connecting tubes 77 and 78 and emerge for connection to a terminal block 100 adjacent the device 79 for ready connection thereto. A suitable external cable 101 terminates in a plug 101a which passes leads through the rear cap 82 to engagement with a mating receptacle (not visible) mounted on chassis 80. An interior cable is connected to the receptacle and leads in the necessary electrical connections from the manual control recorders and power source.

The removable end portion 61a of housing 61 has an opening 102 over which extends a thin sheet 103 of stainless steel. A substantially cylindrical shutter element 104 having a shutter opening 105 is disclosed in more detail in FIGURE 7 wherein it is shown in the closed position, being supported by end fittings 106 and 107 on suitable bearings 108 and 109. Bearing 108 supports the shaft portion 110 of the end fitting 106, the shaft connecting to a suitable splined or equivalent fitting 111 on control shaft 112 actuated by a manual actuating knob 113 on the exterior of the cover plate 114 of the rear opening of the removable source housing 61a. Bearing 108 is carried in a supporting member 115.

The outer end of cylindrical shutter 104 on bearing 109 is rotatable about the stud shaft 116 which forms a part of the end cap 117 that is seatable in housing 61a and is retained therein by tension ring 118 in circular slot 119 thereof. A stationary source carrier 20 is fixed to the shaft 116 by screws 122 at one end and is supported at the other end by fitting 123 in bearing 124 seated in shutter end fitting 106. As shown in FIGURE 8, carrier 120 embodies a recess 125 adapted to receive a source tray 126 carrying a sheet of source material 127 covered by a protective sheath 128. The carrier 120 has an opening 129 also covered by a protective sheath 130 spaced from the source tray 126.

In use, the source assembly 127 including its housing 61a having the components shown in FIGURE 7 therein is assembled with housing 61 by inserting the support 115 into socket fitting 131 forming the terminus of housing 61 until housing 61a abuts housing 61 and shaft 110 seats in the splined fitting 11 of control shaft 12.

The assembly of FIGURE 7 enables removal of the source tray by removal of end cap 17 drawing with it the shutter cylinder 104 and carrier 120 with end fitting 123 which is preferably screw-threaded thereto in the region of collar 132. Fitting 123 is thereafter removed, permitting removal of source tray 126.

It will therefore be apparent that the structural assembly of a radiation sensitive measuring device according to the concept of FIGURES 6 to 8 embodies spaced tubular housings accessible from both ends for operative connection of assemblies therein when inserted for use. This simplified structural concept enables a simplified mounting or suspension system for the apparatus.

Figure 10:
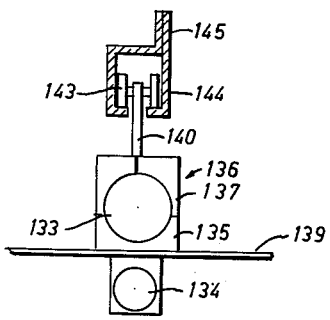
FIGURE 10 is an end view of the apparatus of FIGURE 9.
Figure 11:
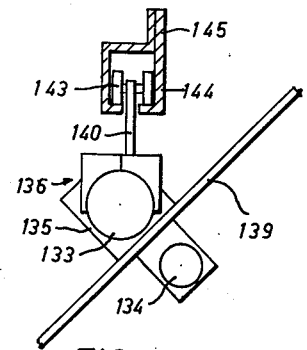
FIGURE 11 illustrates the tilting of the apparatus of FIGURE 10 for measuring a continuously moving inclined sheet.
Figure 12:
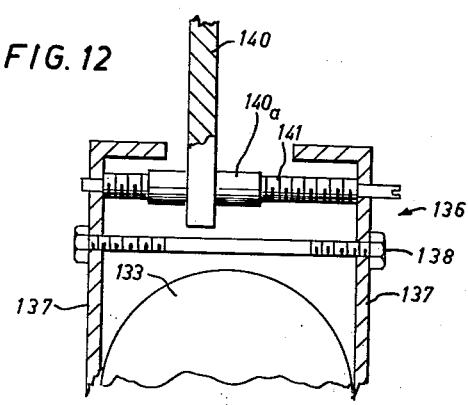
FIGURE 12 is a partial section of the suspension means for the apparatus shown in FIGURES 9 to 11.

Referring to FIGURES 9 to 12, a radiation sensitive measuring device according to the invention having a detector head 133, source tube 134 and cantilever support 135 is suspended by a body clamp 136 comprising clamping plates 137 held together by bolts 138 to suspend the head and source vertically as in FIGURE 10 or at an angle as in FIGURE 11 relative to a sheet 139. When disposed at an angle, the position of effective centre of gravity of the apparatus is compensated for by adjusting the position of suspension bracket 140 having threaded collars 140a running on screws 141 relative to the clamp 136 as indicated in FIGURE 12. Arms 142 extend from the ends of bracket 140 to mount wheels 143 travelling in a suitable track 144 mountable in turn by suitable spaced brackets 145 to a support (not shown). By this means, the apparatus of the invention may be moved over a sheet as desired while it may at any time be withdrawn for servicing or checking or for access to the sheet 139 and apparatus carrying the latter. Furthermore, once retracted, the assembly concept of FIGURES 6 to 8 enables replacement of one of the sub-assemblies in a quick operation whereby the process control effected by the apparatus set forth will be effectively uninterrupted.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What I claim as my invention is:

1. For use in machinery for applying a coating to a continuously fed length of base stock sheet material: apparatus for measuring the deviations from a predetermined standard in the thickness of a coating emplaced on a sheet of base stock material, and adapted to accommodate a wide range of thickness and composition of base stock sheet and of coating thicknesses and compositions, said apparatus comprising means for indicating said deviations; a zeroing control and a sensitivity control for said indicating means respectively settable for producing zero indication corresponding to standard thickness and for producing a desired indication corresponding to a known deviation from said standard, said sensitivity control comprising a first adjustable attenuating means and said zeroing means comprising a first variable impedance and a therewith jointly adjustable second attenuating means, the latter being connected in cascade with said first attenuating means to the input of said indicating means; a first source of penetrative radiation and a first radiation detector irradiated thereby disposed on opposite sides of said coated sheet at a fixed distance from one another; a second source of penetrative radiation and a second radiation detector irradiated thereby and disposed at a fixed distance from one another and having said base stock sheet interposed; a radiation iris means also interposed of said second source and detector and movable therebetween for controlling irradiation of the latter; a first bridge network including said detectors in arms thereof adapted to produce a bridge unbalance voltage having magnitude and sense in accordance with the magnitude and sense of said deviation from standard; means for amplifying said bridge unbalance voltage; means to apply the amplified voltage to said attenuating means cascade; a second adjustable impedance; a second bridge network including said adjustable impedances in arms thereof and adapted to provide an unbalance signal responsive to mismatching of said adjustable impedances; a servo motor normally at standstill and adapted to run responsive to the latter unbalance signal; and means driven by said servo motor for simultaneously adjusting said second impedance so as ultimately to restore balance of said second bridge and terminate running of said motor, and for positioning said radiation iris means thereby to adjust the unbalance voltage of said first bridge network and ultimately said indication to desired values corresponding to a predetermined coating thickness.

2. Apparatus for measuring deviations in the thickness of a sheet material from a predetermined standard thickness capable of accommodating a wide range of material compositions and sheet thicknesses, said apparatus comprising means for indicating said deviations; a zeroing control and a sensitivity control for said indicating means respectively settable for producing zero indication corresponding to standard thickness and for producing a desired indication corresponding to a known deviation from said standard, said sensitivity control comprising a first adjustable attenuating means and said zeroing control means comprising a first variable impedance and a therewith jointly adjustable second attenuating means, the latter being connected in cascade with said first attenuating means to the input of said indicating means; a first source of penetrative radiation and a first radiation detector irradiated thereby disposed on opposite sides of said material at a fixed distance from one another; a second source of penetrative radiation and a second radiation detector irradiated thereby and disposed at a fixed distance from one another; a radiation iris means movably interposed of said second source and detector for variably controlling irradiation of the latter; a first bridge network including said detectors in arms thereof adapted to produce a bridge unbalance voltage having magnitude and sense in accordance with the magnitude and sense of said deviation from standard; means for amplifying said bridge unbalance voltage; means to apply the amplified voltage to said attenuating means cascade, a second adjustable impedance; a second bridge network including said adjustable impedances in arms thereof and adapted to provide an unbalance signal responsive to mismatching of said adjustable impedances; a servo motor normally at standstill and adapted to run responsive to the latter unbalance signal; and means driven by said servo motor for simultaneously adjusting said second impedance so as ultimately to restore balance of said second bridge and terminate running of said motor, and for positioning said radiation iris means thereby to adjust the unbalance voltage of said first bridge network and ultimately said indication to desired values corresponding to a predetermined sheet thickness.

3. For use in a radiation system for the measurement of the mass per unit area of a subject material: a radiation detector housing structure characterized by compactness and accessibility, said structure comprising an elongated tubular and electrically conductive housing having a closed head end and a rear end opening, and provided with a longitudinal radiation opening towards said head end; a generally cylindrical and substantially sealed first ionization chamber disposed within, and generally coaxially with, said housing, said chamber having electrically conductive sidewalls extending in the axial direction and a pair of transverse endwalls which so engage the interior surfaces of said housing sidewalls as to permit sliding removal of said chamber from said housing, the head endwall being seated against said head end, at least one of said endwalls being electrically conductive, said chamber being provided with a plurality of radiation openings confronting the aforesaid radiation opening; an electrode insulated from all walls of said chamber, and disposed to greater extent within, and generally coaxially with said chamber, said electrode insulatedly penetrating through the rear endwall of said chamber; a pair of elongated tubes disposed within and in spaced relation to said housing and generally extending in the axial direction thereof from posteriorly of the exposed rear end of said electrode towards the rear of said housing; a plurality of spaced discs disposed within said housing to the rear of and spaced from said rear basewall, and extending transversely of said axial direction and in slidable engagement with said surfaces, said discs being secured to said tubes for mutual support of discs and tubes within said housing to form a slidably removable unitary disc stack; a plurality of components supported by said discs within said housing and removable in unison therewith, said components including: a radiation source providing a generally axial radiation beam, a second axially extending ionization chamber irradiated by said source, a servo motor, speed reduction means operatively connected to said motor, a potentiometer positionable by said speed reduction means, and an amplifier chassis, at least those discs which carry said second chamber and amplifier chassis being electrically conductive, said second chamber containing a second axially disposed electrode insulated from said second chamber and projecting therefrom to the exterior thereof; a radiation iris supported by and removable in unison with said speed reduction means and operable thereby for translational movement intermediate said source and second chamber; a removable cap substantially sealing off said rear end opening and provided in turn with an opening for receiving an external connector; an internal connector secured to the rearmost one of said components and facing the last mentioned opening, adapted to engage said external connector; a pair of electrical contact members respectively engaging the exposed portions of said electrodes; and a plurality of electrical conductors interconnecting said internal connector, amplifier chassis, servo motor, potentiometer, and electrical contact members, at least some of said conductors being fed through said tubes, a pair of said tube fed conductors respectively being connected to and supporting said electrical contact members, said conductors and electrical contact members being removable in unison with said tubes.

4. Apparatus for measuring the thickness of a coating emplaced on base stock material, comprising in combination: radiation source means providing a pair of radiation beams, the first of which is directed at the coated material and the second of which is directed at the subject base stock material prior to coating thereof; a detector disposed in the path of said first beam and adapted to generate an electrical signal responsive to radiation emergent from said coated material; a second detector disposed in the path of said second beam and adapted to generate an electrical signal responsive to the radiation emergent from said subject material; radiation iris means disposed in one of said paths, being reversibly movable in translation along said one path and provided with a radiation opening through which the radiation directed along said one path passes toward the respective detector, for adjustably controlling the radiation received by said respective detector and consequently the respective one of said signals; means for amplifying the difference in electrical signals generated by said detectors and providing a measure of the coating thickness; and electro-mechanical means adapted on energization thereof to move said iris means along said one path to adjust said respective signal and consequently said difference and amplified signals to desired values corresponding to a predetermined coating thickness.

5. Apparatus for measuring the mass per unit area of a subject material, comprising in combination; radiation source means providing a pair of radiation beams one of which is directed at said subject material; a detector disposed in the path of said one beam and adapted to generate an electrical signal responsive to radiation emergent from said subject material; a second detector disposed in the other radiation beam path and adapted to generate a second electrical signal responsive to the radiation incident thereon; radiation iris means disposed in said other path, being reversibly movable in translation along said other path and provided with a radiation opening through which the respective radiation beam passes along said other path toward said second detector, for adjustably controlling the radiation received by said second detector and consequently said second signal; means for amplifying the difference in electrical signals generated by said detectors and providing a measure of the mass per unit area of said subject material; and electro-mechanical means adapted upon energization thereof to move said iris means along said other path to adjust said second signal and consequently said difference and amplified signals to desired values corresponding to a predetermined mass per unit area of subject material.

References Cited in the file of this patent

UNITED STATES PATENTS

| | | |
|---|---|---|
| 2,467,812 | Clapp | Apr. 19, 1949 |
| 2,513,818 | Roop | July 4, 1950 |
| 2,586,303 | Clarke | Feb. 19, 1952 |
| 2,618,751 | Fearnside et al. | Nov. 18, 1952 |
| 2,647,214 | Penney et al. | July 28, 1953 |
| 2,675,483 | Leighton et al. | Apr. 13, 1954 |
| 2,678,399 | Fay | May 11, 1954 |
| 2,750,986 | Russell et al. | June 19, 1956 |
| 2,793,345 | Hags | May 21, 1957 |